Feb. 23, 1926.
C. N. BROWN
1,574,361
SOLDERING IRON
Filed August 19, 1924
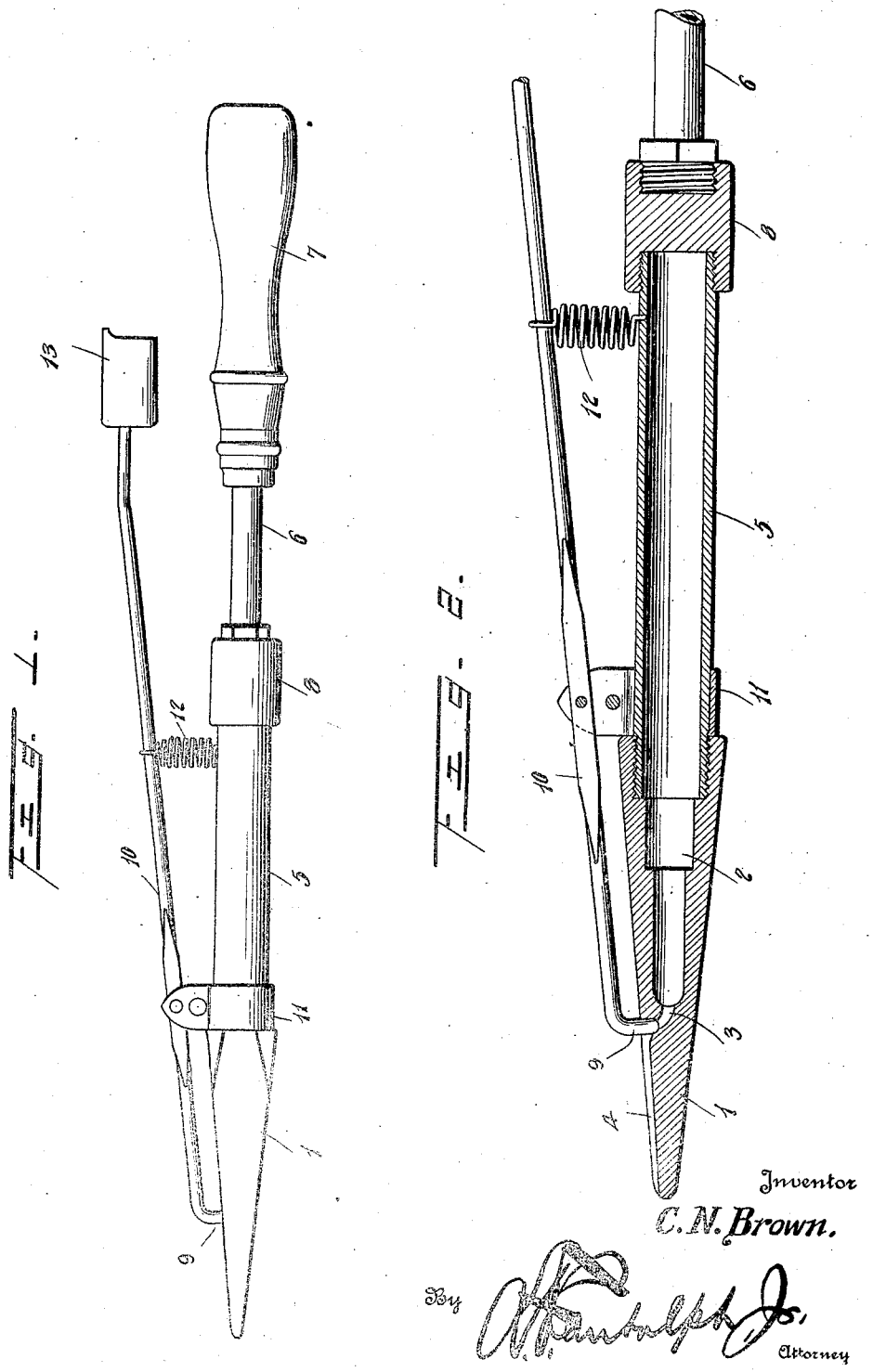
Inventor
C. N. Brown.

Patented Feb. 23, 1926.

1,574,361

UNITED STATES PATENT OFFICE.

CLARENCE N. BROWN, OF COLTON, CALIFORNIA.

SOLDERING IRON.

Application filed August 19, 1924. Serial No. 732,988.

*To all whom it may concern:*

Be it known that I, CLARENCE N. BROWN, a citizen of the United States, residing at Colton, in the county of San Bernardino and State of California, have invented certain new and useful Improvements in Soldering Irons; and I do hereby declare the following to be a full, clear, and exact description of the invention, such as will enable others skilled in the art to which it appertains to make and use the same.

The present invention has relation to the class of tools particularly designed for use by tin and coppersmiths and has for its object the provision of a soldering iron embodying a chambered point, a reservoir associated with the point for containing a quantity of solder and a valve controlled outlet for regulating the discharge of the molten solder as required, the point having a channel for directing the solder to the point of use.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a side view of a soldering iron embodying the invention, and

Figure 2 is a central longitudinal sectional view thereof showing the parts on a larger scale.

Corresponding and like parts are referred to in the following description and designated in both views of the drawings by like reference characters.

The soldering iron comprises a point 1 which is usually of copper and in which is formed a chamber 2 and a port 3, the latter connecting the delivery end of the chamber 2 with a channel 4 formed in a side of the point 1 and extending from the port 3 to the extremity of the point. A reservoir 5 consisting of a short length of tube is coupled to the base of the point 1 and constitutes a part of the stem and provides for receiving a quantity of solder. A stem 6 is coupled to the reservoir 5 and is provided with a handle 7, the coupling 8 having a threaded socket at each end to receive the reservoir 5 and stem 6. The coupling 8 also functions as a closure for the reservoir 5 and when detached from the latter admits of solder being supplied to the reservoir which is in communication with the chamber 2 to keep the same supplied with solder as the latter is used.

A valve 9 normally closes the port 3 and as shown consists of the bent end of a rod 10 which is fulcrumed upon a clamp 11 secured to the reservoir 5 adjacent the point 1. A spring 12 is interposed between the reservoir 5 and rod 10 and normally exerts an outward pressure upon the rear portion of the rod 10 to hold the valve 9 in position to close the port 3. A handle 13 is fitted to the rear end of the rod 10 and is disposed adjacent the handle 7 so as to be pressed upon by a digit of the hand to open the valve 9 when it is desired to permit the outflow of molten solder from the chamber 2.

Solder is supplied in quantity to the reservoir 5 and the point 1 of the iron is heated in the usual way thereby reducing the solder in the chamber 2 to a molten condition so that when the port 3 is uncovered the molten solder flows from the chamber 2 through the port 3 to the channel 4, thence to the extremity of the point to be applied to the work as required. As the solder flows from the chamber 2 the latter is supplied from the reservoir 5, it being understood that the tool is heated from time to time in the usual way so as to maintain the solder within the chamber 2 in a molten condition.

What is claimed is:—

A soldering iron comprising a solid point, a solder reservoir tube secured in one end of said point, said point having an exterior solder discharge groove, a relatively small passageway extending substantially diagonally of the point and from the reservoir to said groove, a manually controlled valve for said passageway, said valve having an operating handle, said tube terminating short of the gripping end of said handle, a coupling forming a closure and engaging the feed end of said tube, and a stem carried by the coupling disposed opposite the gripping end of the handle and adapted for engagement jointly therewith.

In testimony whereof I affix my signature.

CLARENCE N. BROWN.